US007154034B2

(12) United States Patent
Lynch

(10) Patent No.: US 7,154,034 B2
(45) Date of Patent: Dec. 26, 2006

(54) METHOD AND APPARATUS FOR PROTECTION OF WILDLIFE FROM CONTACT WITH POWER PHASE CUTOUT MECHANISM

(76) Inventor: Michael D. Lynch, 7758 Pickeering Cir., Reno, NV (US) 89511

( * ) Notice: Subject to any disclaimer, the term of this patent is extended or adjusted under 35 U.S.C. 154(b) by 0 days.

(21) Appl. No.: 10/741,167

(22) Filed: Dec. 18, 2003

(65) Prior Publication Data

US 2004/0184210 A1 Sep. 23, 2004

Related U.S. Application Data

(60) Provisional application No. 60/435,836, filed on Dec. 19, 2002.

(51) Int. Cl.
*H02B 1/06* (2006.01)

(52) U.S. Cl. ................. 174/5 R; 174/40 R; 174/138 E

(58) Field of Classification Search ................ 174/5 R, 174/52.1, 135, 41, 40 R, 138 E; 337/168–181, 337/186, 187, 199
See application file for complete search history.

(56) References Cited

U.S. PATENT DOCUMENTS 2,263,319 A * 11/1941 Treanor ...................... 174/139
3,766,310 A * 10/1973 Paschen .................. 174/138 F
4,045,762 A * 8/1977 Foulkes ...................... 337/401
4,414,527 A * 11/1983 Biller ......................... 337/180
4,540,968 A * 9/1985 Kato et al. .................... 337/31
5,267,880 A * 12/1993 Tamm ........................ 439/622
6,392,526 B1 * 5/2002 Roberts et al. ............. 337/178

FOREIGN PATENT DOCUMENTS

JP 08007711 A * 1/1996

OTHER PUBLICATIONS

English Abstract for JP08007711A, Izuhara, Jan. 12, 1996.*
English translation of Detailed description of JP08007711A, Izuhara, Jan. 12, 1996.*

* cited by examiner

*Primary Examiner*—Jinhee Lee
(74) *Attorney, Agent, or Firm*—Jack JMaev

(57) ABSTRACT

Method and apparatus for protecting wildlife from contact with an energized fuse assembly known as a “cutout”, also known as a “disconnect”. The cutout is shrouded from above and three sides. One side is left open to facilitate installation or removal of a fuse holder assembly. The shroud is formed to allow the use of a hot-stick for installation and removal of a fuse holder assembly into a fuse receptacle formed by upper and lower contact assemblies held in opposition to each other by an insulator. The shroud provides a slot enabling installation when a wire is connected to the upper contact assembly. A pin is used to hold the shrouding in place.

13 Claims, 12 Drawing Sheets

METHOD AND APPARATUS FOR PROTECTION OF WILDLIFE FROM CONTACT WITH POWER PHASE CUTOUT MECHANISM

RELATED APPLICATIONS

This present application is related to a provisional application Ser. No. 60/435,836 filed on Dec. 19, 2002, entitled "Method and Apparatus for Protection of Wildlife from Contact with Power Phase Cutout Mechanism", by Lynch, currently pending, for which the priority date for this application is hereby claimed.

FIELD OF THE INVENTION

This invention relates generally to protection of wildlife environments; and specifically to a prevention of electrocution or shock resulting from contact with power cutout or disconnect mechanisms.

BACKGROUND OF THE INVENTION

An increasingly sensitive environmental issue is that of preventing injury to wildlife that may occur as a result of contact with energized electrical distribution components. Modernly, electrical distribution systems rarely provided any type of electrical barrier between energized components and other objects. For instance, electrical conductors that carry electrical power from power-pole to power-pole are typically devoid of any type of insulation. In the general sense, this is quite acceptable since electrical injury typically requires a complete circuit path phase to ground or phase to phase. Hence, a small bird may land on an electrical conductor without any adverse effects. This is because the small bird contacts only one electrical conductor and the current flowing through the conductor cannot find a "path to ground".

It is only when a living creature, including man or beast, contacts an exposed electrical conductor or other energized component and electrical current can find a path to ground that severe injury can occur. This type of unfortunate incident is more likely to occur where exposed electrical conductors are in close proximity to a grounded object or to another conductor or component that is carrying an opposite phase of a particular circuit.

In one example, a conductor, which is typically electrically isolated from a power pole by means of an insulator, can be contacted by a lineman or wildlife that has climbed the power pole. In such case, the living creature is in close enough proximity to ground by virtue of being in contact with the power pole that the slightest contact with an exposed electrical conductor or other energized component may prove fatal. Larger birds, such as raptors, are often killed when they land on or attempt to land on an exposed electrical conductor near a power-pole or on the power-pole itself. When landing on the conductor near a power-pole, a larger bird can touch the power-pole with a wing and provide a path to ground. A large bird may also short two opposite phases together. This results in a short circuit where electrical current flows through the body of the unfortunate bird from one phase to the other.

Modern electrical distribution techniques employ various types of components to affect the delivery of electrical power to residential, commercial and industrial customers. In order to effectively manage the delivery of power, one component used in today's power delivery schema is a power interruption device known as a "cutout". Various forms of cutouts exist and most follow the general form of that described by Biller in U.S. Pat. No. 4,414,527. The modern cutout comprises an insulator that may be mounted onto a power pole or other support structure. The insulator (reference No. 14 in the referenced patent) supports an upper and lower contact assembly. The contact assemblies hold a fuse holder assembly that completes an electrical circuit between the two contact assemblies. Thus the opposing upper and lower contact assemblies form a "fuse receptacle" capable of receiving a fuse holder assembly.

Each contact assembly further comprises a conductor connector. The conductor connectors are used for connecting the cutout to a tap-point comprising the power distribution system on one end and for connecting the cutout to an electrical load. Typically, a cutout is installed between an energized electrical conductor that carries electrical power from power-pole to power-pole and a step-down transformer. In one application, a cutout is generally mounted on the power pole just below a cross-member that is used to support the inter-pole conductors. The step-down transformer, which is also usually mounted proximate to the cutout, typically receives electrical power from the electrical conductor and reduces the electrical power to a lower voltage level suitable for distribution to an end customer.

The entire cutout assembly poses a threat not only to wildlife, but also to lineworkers. This is because the upper and lower contact assemblies are not insulated. Lineworkers accept the risk of working with high-voltage electrical power as one of many occupational hazards that are encountered on the job and with foreknowledge of the hazard avoid contacting an energized cutout. Raptors and other large birds often use power-poles, their associated supporting member and components for perching and hunting. Many times, raptors and other large birds return to the power-pole with prey that they intend to consume. Because of the usual manner in which a cutout is mounted, slightly below the power-pole's cross-member, a larger bird can use the cutout as a shelf; ideal for helping manipulate their quarry during consumption. As soon as the raptor contacts the non-insulated, energized cutout assembly it can be severely injured or killed. Other animals, e.g. squirrels, can suffer the same fate as raptors and other large birds.

SUMMARY OF THE INVENTION

The present invention comprises a method for protecting wildlife from potential electrocution and electrical shock through inadvertent contact with an energized cutout. Generally, a cutout is mounted on a power pole and is used as a fusing circuit between a high-voltage power tap on a distribution system and a transformer. However, the scope of the present invention is not intended to be limited to this one example application.

A cutout typically comprises an upper connector and contact assembly that is held in opposition to a lower connector and contact assembly by an insulator. The insulator holds the upper and lower contact assemblies in opposition to each other so as to form a fuse receptacle. The present invention provides for a method for protecting wildlife by shrouding the upper connector, the upper contact assembly and a volume of space proximate to the upper end of the fuse receptacle formed by the two contact assemblies. The volume protected by the shroud is made large enough to accommodate not only the upper end of a fuse holder assembly, but also a pull-ring integral to a fuse holder assembly. Such a ring may be used to facilitate the removal of the fuse holder assembly from the fuse receptacle. Even though shrouds are provided, the present method requires that the dielectric integrity of the insulator is to be maintained while the shroud is disposed in an operational position. According to one alternative method, the dielectric integrity of the insulator is maintained by not electrically bridging any of one or more skirts typically integral to the insulator.

Accordingly, shrouding of a cutout may be accomplished by positioning a shroud over an upper conductor that may be attached to the upper connector. The shroud may then be drawn over the upper end of the cutout assembly. This may be done while the conductor is energized. Once in position, the shroud is held in place by a pin that penetrates two sides of the shroud and is positioned beneath the upper contact assembly.

Alternative methods of the present invention provide for shrouding the upper conductor that is used to connect the upper contact assembly to a tap-point in a power distribution system. In one illustrative variation of the present method, the lower connector, the lower contact assembly and a volume surrounding the lower end of the fuse receptacle are also shrouded.

The present invention further comprises a cutout cover assembly. According to one example embodiment, a cutout cover assembly comprises a first shroud section, a second shroud section and a third shroud section. Generally, the first shroud section blends into the second shroud section. In like manner, the second shroud section blends into the third shroud section. Each shroud section comprises walls and a top surface.

The walls of the first shroud section are used to envelope a portion of the perimeter of an insulator and a top surface is supported by the upper edge of this wall. The second shroud section continues with two opposing walls that stem from the two ends of the wall surrounding the insulator and which straddle the upper contact assembly. The third shroud section again continues with two opposing walls in order to envelope a volume of space in proximity to the upper end of the fuse receptacle and, according to one embodiment, slope outward and down away from the upper contact assembly to form a funnel-shape.

The second shroud section, according to one alternative embodiment, further comprises pin holes placed in the two opposing walls and a further placed below either the upper contact assembly or the hook assembly.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
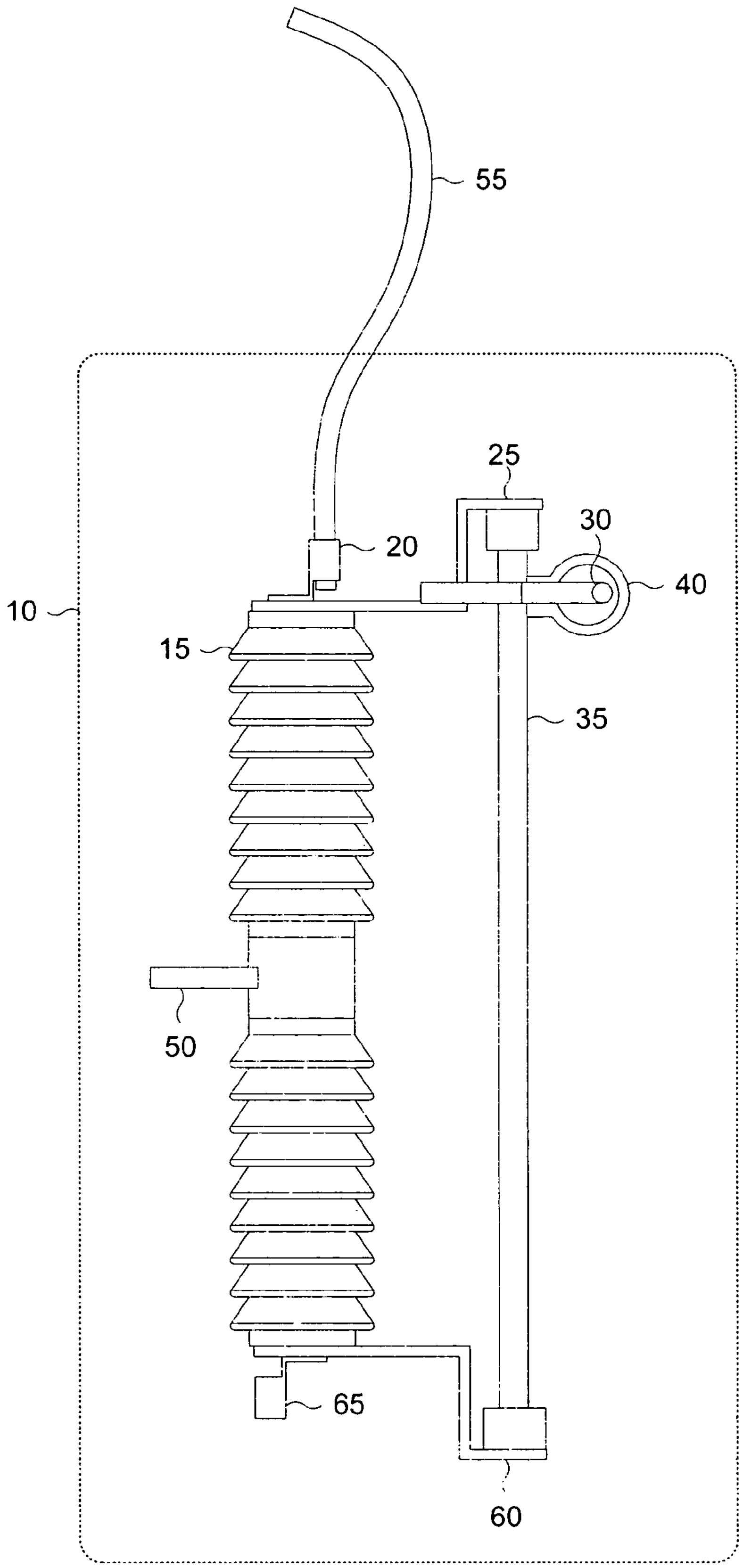
FIG. 1 is a pictorial representation of an electrical cutout assembly.

FIG. 1 is a pictorial representation of an electrical cutout assembly. Electrical power distribution systems disseminate electrical power through a distribution grid. When power is delivered from the distribution grid, it is normally received at a very high voltage. The high-voltage power is generally transformed to a lower voltage by a transformer before it is delivered to a power consumer such as a home or a business. It should be noted that these two classes of power consumers are cited as example users of a typical power distribution system and are not intended to limit the scope of the present invention.

It is not uncommon for a distribution system to distribute electrical power at voltage levels; as high as 69,000 volts and more. A cutout 10 comprises an insulator 15 which is used to support an upper contact assembly 25. The upper contact assembly usually includes an upper connector 20. The insulator 15 is used to provide electrical isolation between the upper contact assembly 25 and a mounting bracket 50 and a lower contact assembly 60.

The cutout 10 is typically installed between a tap-point on a distribution system and a transformer that receives high-voltage distribution power. The transformer converts the received power to a lower voltage level suitable for delivery to a consumer. The cutout 10 is generally mounted on a power pole by means of the mounting bracket 50. The upper connector 20 is used to connect an electrical wire 55 to the upper contact assembly 25. The other end of the electrical wire 55 is generally connected to a high-voltage tap-point provided by the power distribution system.

The cutout 10 further comprises a lower contact assembly 60. The lower contact assembly is generally supported by an opposing end of the insulator 15. The upper and lower contact assemblies (25, 60) generally form a fuse receptacle capable of receiving a fuse holder assembly 35. Generally, the lower contact assembly 60 further comprises a lower connector 65 that may be used to electrically connect the lower contact assembly 60 to a transformer used to step-down power to a lower voltage suitable for delivery to a consumer.

The fuse holder assembly 35 typically provides a pull-ring 40. The upper contact assembly 25 further comprises a hook assembly 30. The hook assembly 30 may be used as an attachment point for a “load-breaking” tool. The load-breaking tool may be attached to the hook assembly 30 and the pull-ring 40 in order to facilitate removal of the fuse holder assembly 35 from the fuse receptacle formed by the upper and lower contact assemblies (25, 60). The operation of the load-breaking tool as described herein is well-known and further discussion of its operation and interaction with the hook assembly 30, the fuse holder assembly 35 and its integral pull-ring 40 is not needed to teach those skilled in the art of electrical power distribution.

In most instances, the fuse holder assembly 35 comprises a fuse. The pull-ring 40 included in the fuse holder assembly 35 is generally not insulated. The upper 25 and lower 60 contact assemblies are also not insulated. Neither is the electrical wire 55 that connects the upper contact assembly 25 to the high-voltage tap-point. In most instances, installation of the cutout 10 is effected toward the top most portion of a power pole such that it may pose an electrocution hazard to wildlife that may come in contact with the electrically exposed upper 25 and lower 60 contact assemblies.

Figure 2:
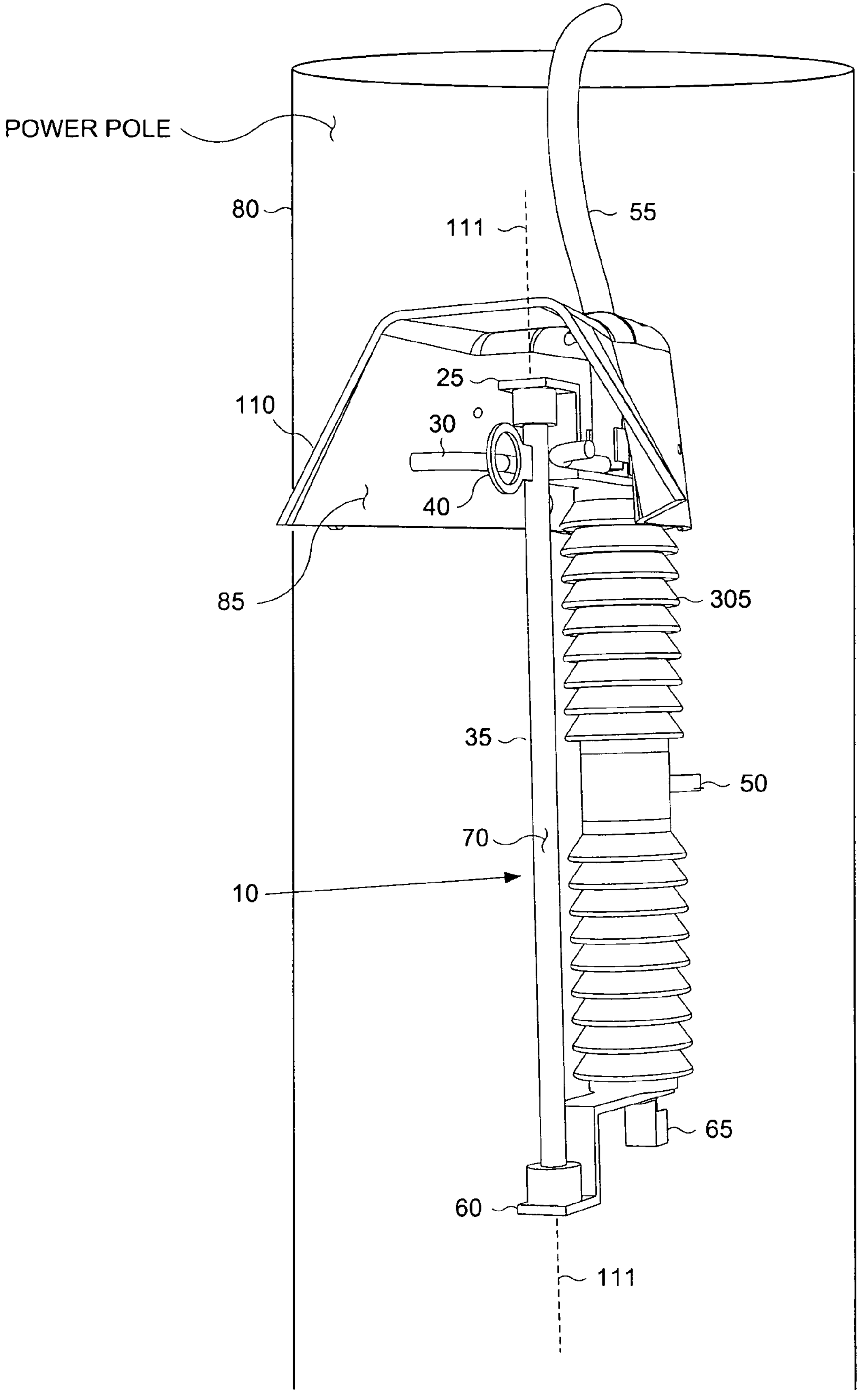
FIGS. 2 and 3 are, respectively, a pictorial diagram that depicts the position of a shroud when it is installed on a cutout and a flow diagram that depicts one illustrative variation of the present method.
Figure 3:
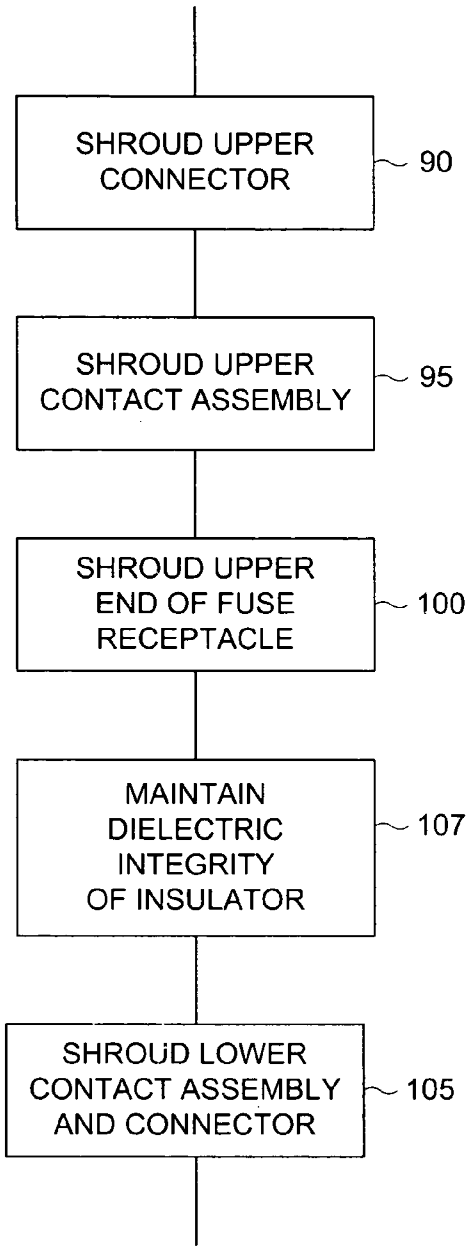

FIGS. 2 and 3 are, respectively, a pictorial diagram that depicts the position of a shroud when it is installed on a cutout and a flow diagram that depicts one illustrative variation of the present method. When the cutout 10 is mounted onto a power pole 80 by means of the mounting bracket 50, it is the upper contact assembly 25 and its associated connection wire 55 that pose the greatest threat to wildlife. Accordingly, the method of the present invention provides for shrouding the upper connector (step 90), shrouding the upper contact assembly (step 95) and shrouding the upper portion of the fuse receptacle (step 100) formed by the upper and lower contact assemblies (25, 60). In one variation of the present method, shrouding of the upper contact assembly comprises an additional step of shrouding the hook assembly 30. According to yet another variation of the present method, shrouding of the fuse receptacle comprises shrouding of a volume capable of receiving the upper end of a fuse holder assembly 35 and its associated pull-ring 40. In yet another alternative example method, the dielectric integrity of the insulator 15 is maintained (step 107). According to one alternative method, the dielectric integrity of the insulator is maintained by avoiding bridging of skirts 305 included in the insulator 15.

According to yet another derivative method of the present invention, an additional step may be applied wherein the lower connector 65 and the lower contact assembly 60 are also shrouded (step 105). According to yet another variation of this method, an opening 85 is provided to the volume surrounding the upper portion of the fuse receptacle formed by the upper and lower contact assemblies (25, 60). In yet another variation of the present method, the opening is formed to facilitate attachment of the load-breaking tool to the hook assembly 30 and to a ring 40 included on the fuse holder assembly 35 such that the load breaking tool can be applied an some angle offset from an axial axis 111 defined by the fuse holder assembly 35 when it is disposed in the fuse receptacle formed by the upper and lower contact assemblies (25, 60). The opening, according to one alternative method, is provided in a funnel-like shape fashioned in one end of a shrouded unit 110 that may be disposed over the upper end of a cutout 10.

Figure 3A:
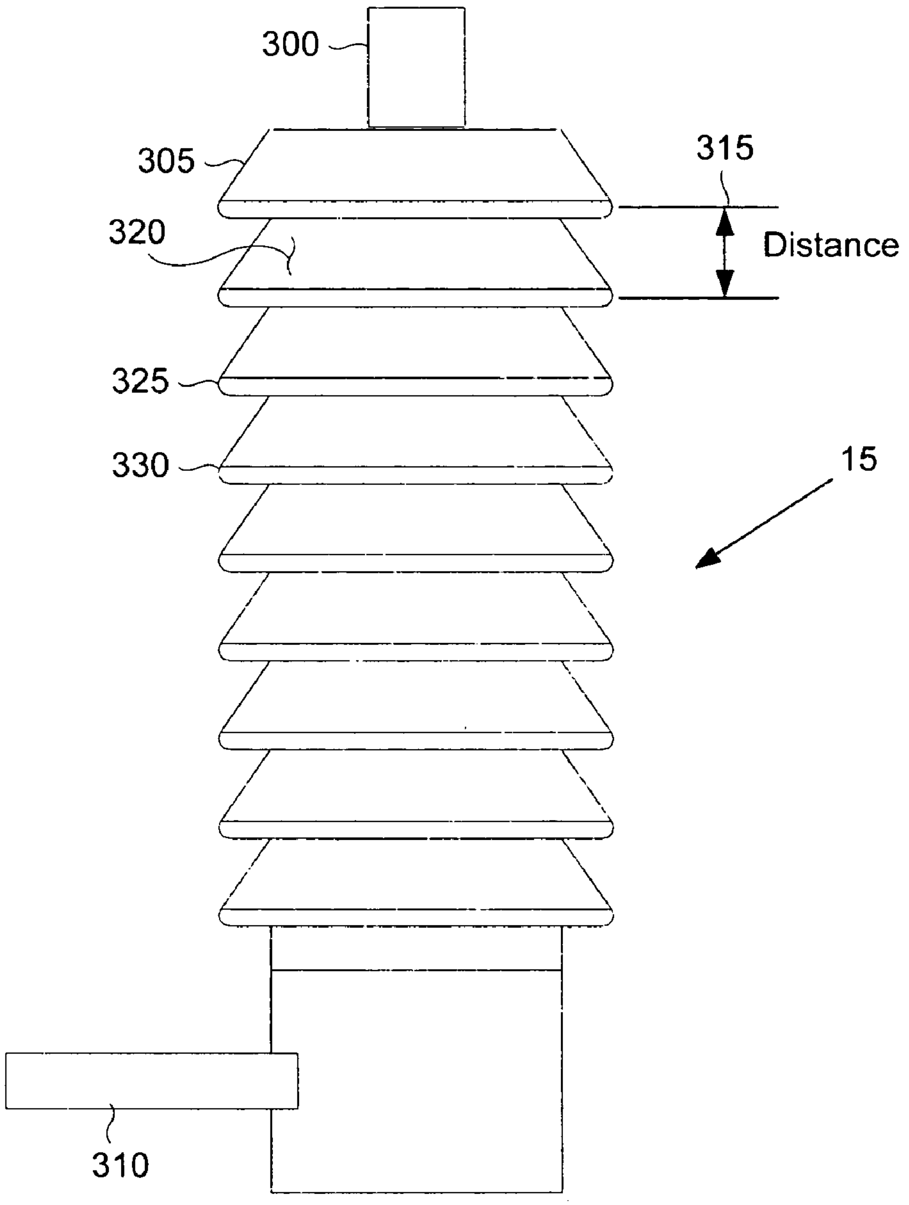
FIG. 3A is a pictorial representation of an insulator that illustrates application of a method for maintaining the dielectric integrity of the insulator.

FIG. 3A is a pictorial representation of an insulator that illustrates application of a method for maintaining the dielectric integrity of the insulator. A common misconception is that electricity flows through a wire, often referred to as a "conductor". This is not true. Electricity actually flows over the surface of a material and not through the material. In order to provide sufficient dielectric capability, the surface area of an insulator must be large enough so as to exhibit a sufficient leakage distance between an energized conductor and ground. A cutout 10 includes an insulator 15 applied in a manner so as to electrically insulate a conductor from ground.

As depicted in the figure, an insulator is typically fabricated in a form that includes some quantity of skirts 305. The collective surface area of the skirts 305 must then provide sufficient leakage distance between a first terminal 300 and a second terminal 310, which is most likely grounded, but may be attached to a second phase that is not in phase with power applied to the first terminal 300. As can be appreciated from this figure, breaching the distance between two skirts 305 does not merely result in a reduction of some vertical distance d 315, but rather reduces the surface area 320 around the entire skirt 305.

Accordingly, in order to maintain the dielectric integrity of an insulator 15, any shroud placed proximate to the isolative material from which the insulator 15 is formed must not short the surface area of a skirt 305. This, according to one alternative method, is accomplished by not bridging the apex 325 of one skirt 305 to the apex 330 another skirt 305 included in the insulator 15.

Figure 4:
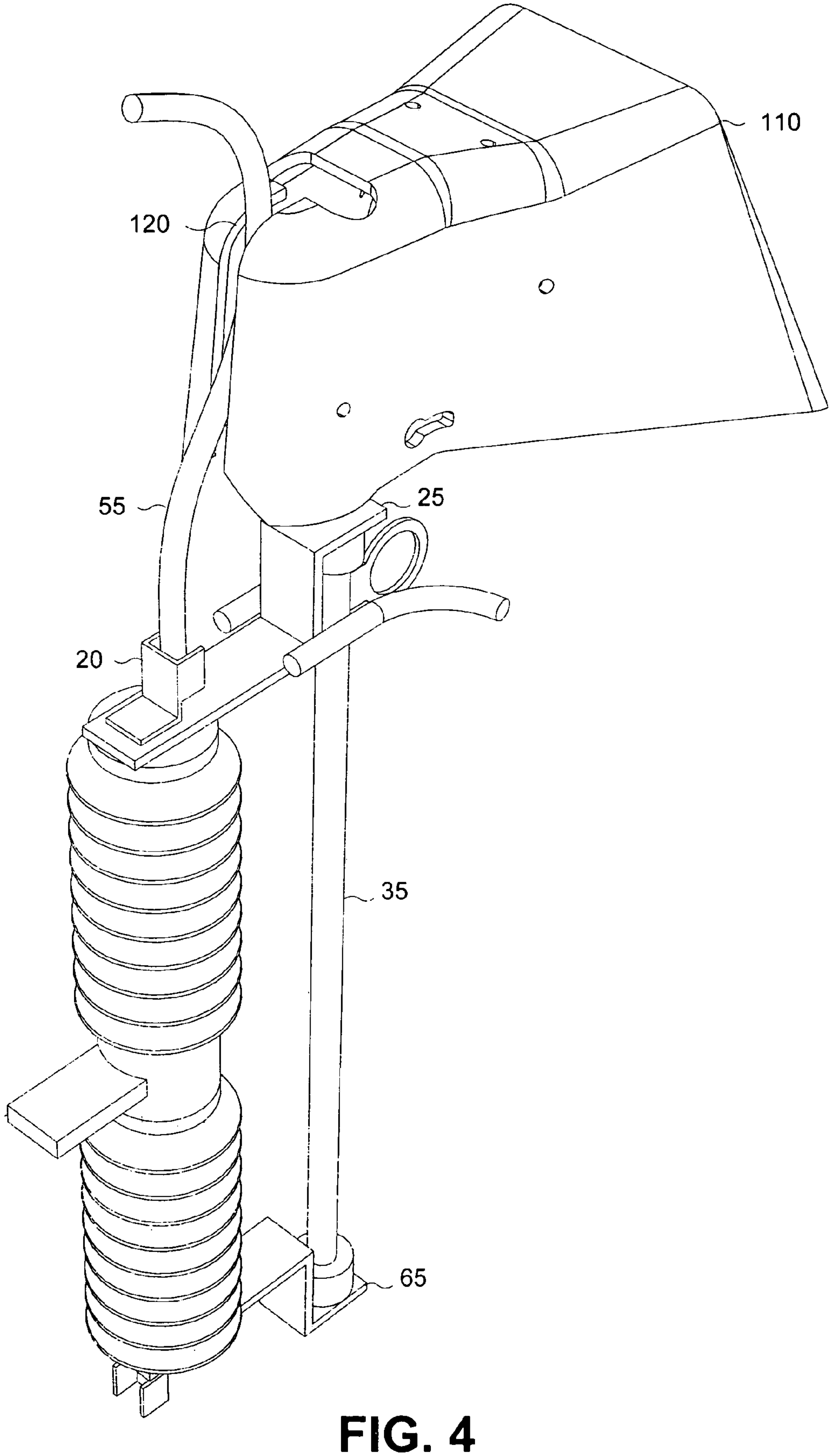
FIG. 4 is a pictorial diagram that depicts one illustrative method according to the present invention for shrouding the upper portion of a cutout.

FIG. 4 is a pictorial diagram that depicts one illustrative method according to the present invention for shrouding the upper portion of a cutout. One aspect of the present method that provides for shrouding of an upper connector 20, an upper contact assembly 25 and a volume capable of receiving the upper-end of a fuse holder assembly 35 (i.e. the upper-end of the fuse receptacle formed by the upper and lower contact assemblies (25, 60)) may be achieved by positioning a shroud 110 over a conductor 55 which is connected to the upper connector 20. According to this illustrative variation of the present method, a shroud 110 may be positioned over a conductor 55 and the shroud 110 may then be drawn over the upper end of the cutout 10. One example embodiment of a shroud 110 that enables this method comprises a slot 120 for receiving the conductor 55. As such, the shroud 110 may be installed onto the cutout 10 without the need to first disconnect the conductor 55 from the connector 20. This method may also be employed where power continues to flow through the conductor 55. Hence, one alternative method according to the present invention provides for a step wherein shrouding of a cutout 10 is accomplished whilst the cutout 10 is energized.

Figure 5:
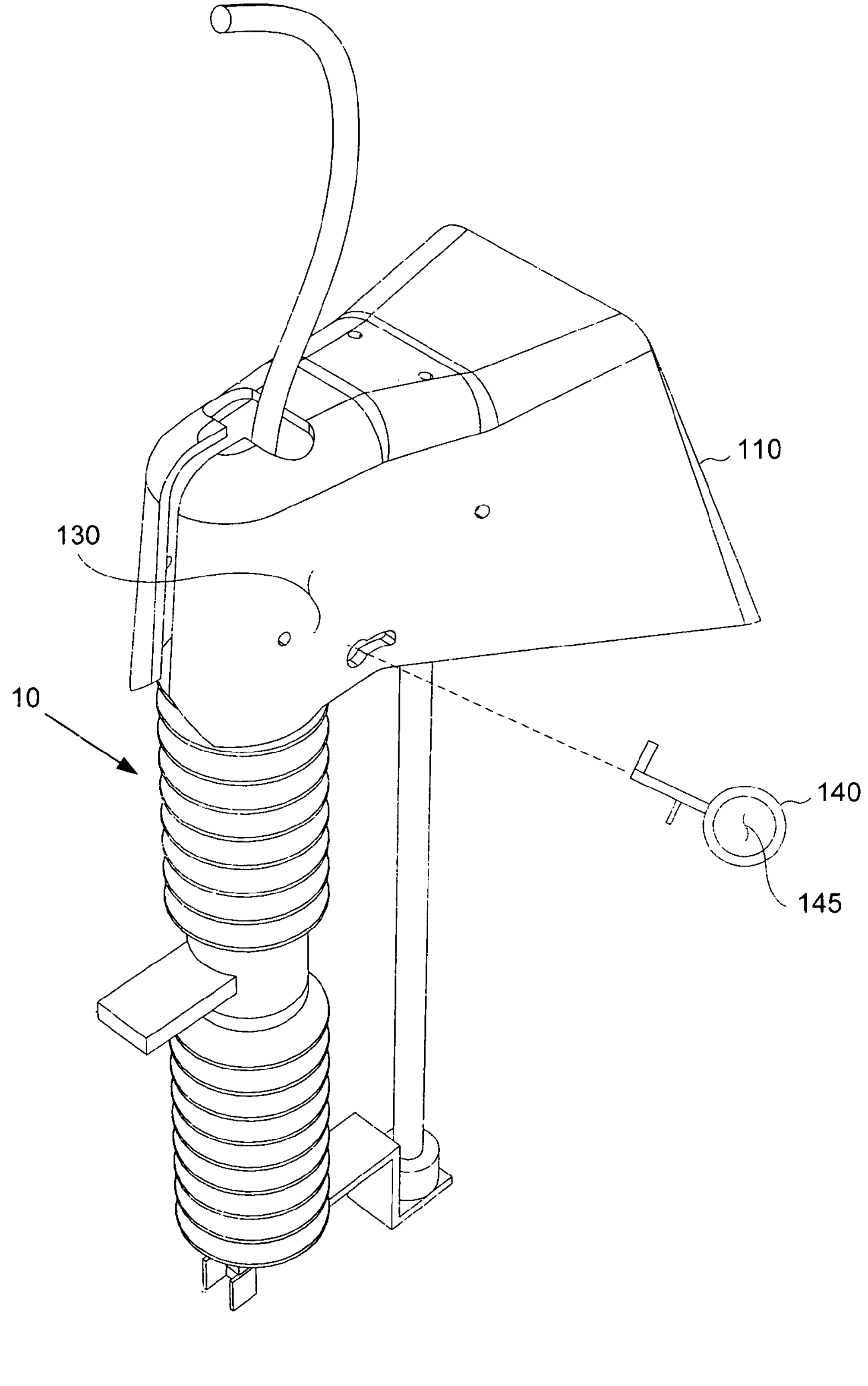
FIG. 5 is a pictorial diagram that depicts one example method for securing a shroud unit installed on a cutout.

FIG. 5 is a pictorial diagram that depicts one example method for securing a shroud unit installed on a cutout. Generally, once a shroud unit 110 is drawn over the upper end of a cutout 10, it is susceptible to various forces, such as wind and other weather, which may act to dislodge the shroud unit 110 from its intended installation position. To preclude this, one variation of the present method provides for the installation of a pin 140 through a first side 130 of the shroud 110 and through a side of the shroud 110 opposing said first side. As the pin 140 is disposed through the two sides, it is positioned so as to be beneath the upper contact assembly 25. Hence, any forces acting to dislodge the shroud cover 110 may be opposed when the pin 140 encounters the upper contact assembly 25. According to one variation of the present method, the pin 140 comprises an eyelet 145. The eyelet 145 facilitates the installation of the pin 140 using an installation tool known as a "hot-stick". By using this or other types of tools to manipulate the pin 140, the cutout cover 110 may be secured in place by personnel working either at ground level, off a power pole or out of a bucket truck.

Figure 6:
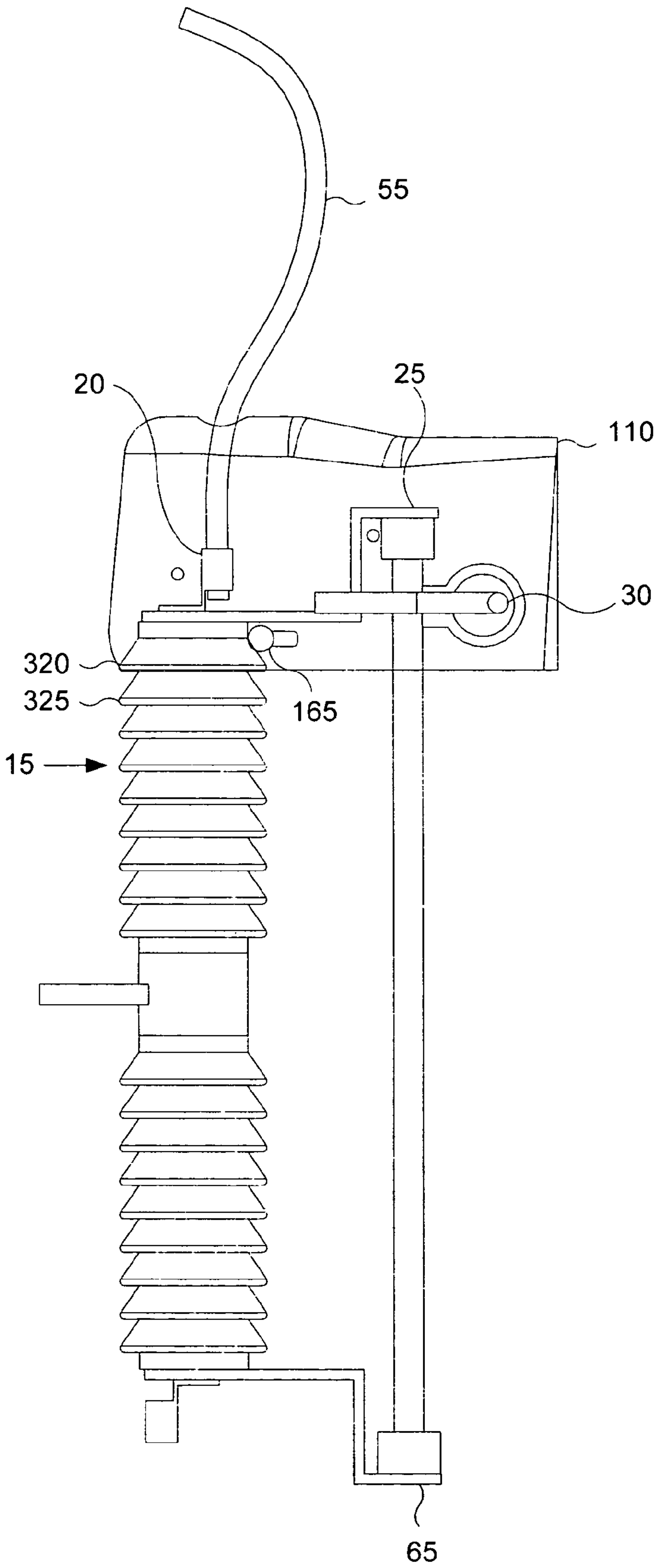
FIG. 6 is a pictorial diagram that depicts one alternative method for securing a shroud unit once it is installed on a cutout.

FIG. 6 is a pictorial diagram that depicts one alternative method for securing a shroud unit once it is installed on a cutout. A first securing method provides for the installation of a pin beneath the upper contact assembly 25 (as depicted by a first pin placement 160).

FIG. 6 further illustrates that the shroud 110 does not bridge a first apex 325 of a first skirt included in the insulator 15 and a second apex 330 or a second skirt included in the insulator 15.

Figure 7:
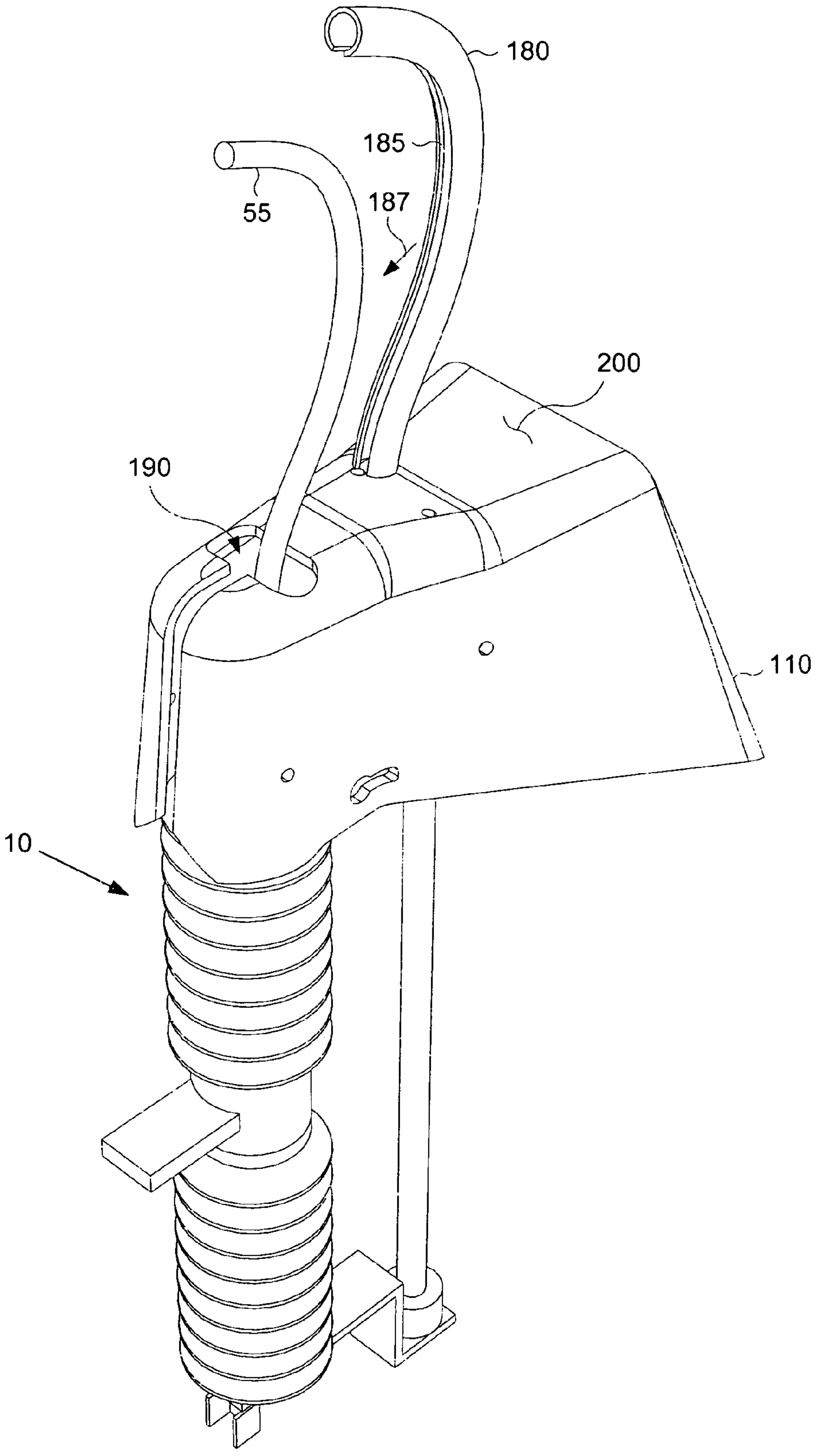
FIGS. 7 and 8 are pictorial representations that depict one example of a derivative method of the present invention for shrouding a conductor.
Figure 8:
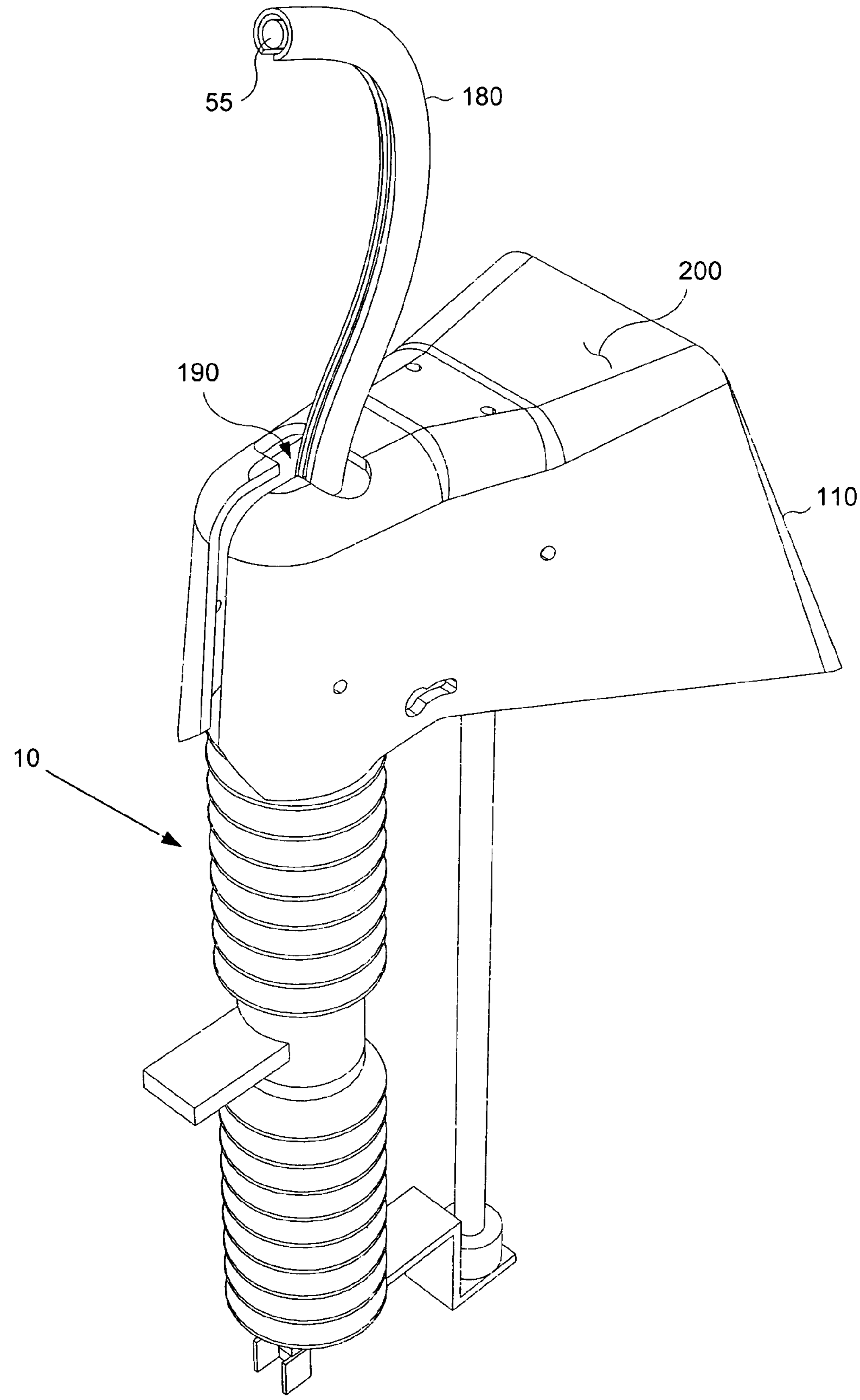

FIGS. 7 and 8 are pictorial representations that depict one example of a derivative method of the present invention for shrouding a conductor. Once a shroud assembly 110 is positioned over a cutout 10, this variation of the present method provides for shrouding the conductor 55 connected to the upper contact assembly 25. According to this variation of the method, a flexible insulator 180 comprising a longitudinal slot 185 is spread apart about the slot 185 and positioned 187 over the conductor 55. Once so positioned, the flexible insulator 180 envelopes the conductor 55 as shown in FIG. 8. The flexible insulator 180 may then be drawn partially into an internal cavity 190 of the shroud 110 or may be abutted to a top surface 200 of the shroud 110. The flexible insulator may be formed of any suitable isolative material.

Figure 9:
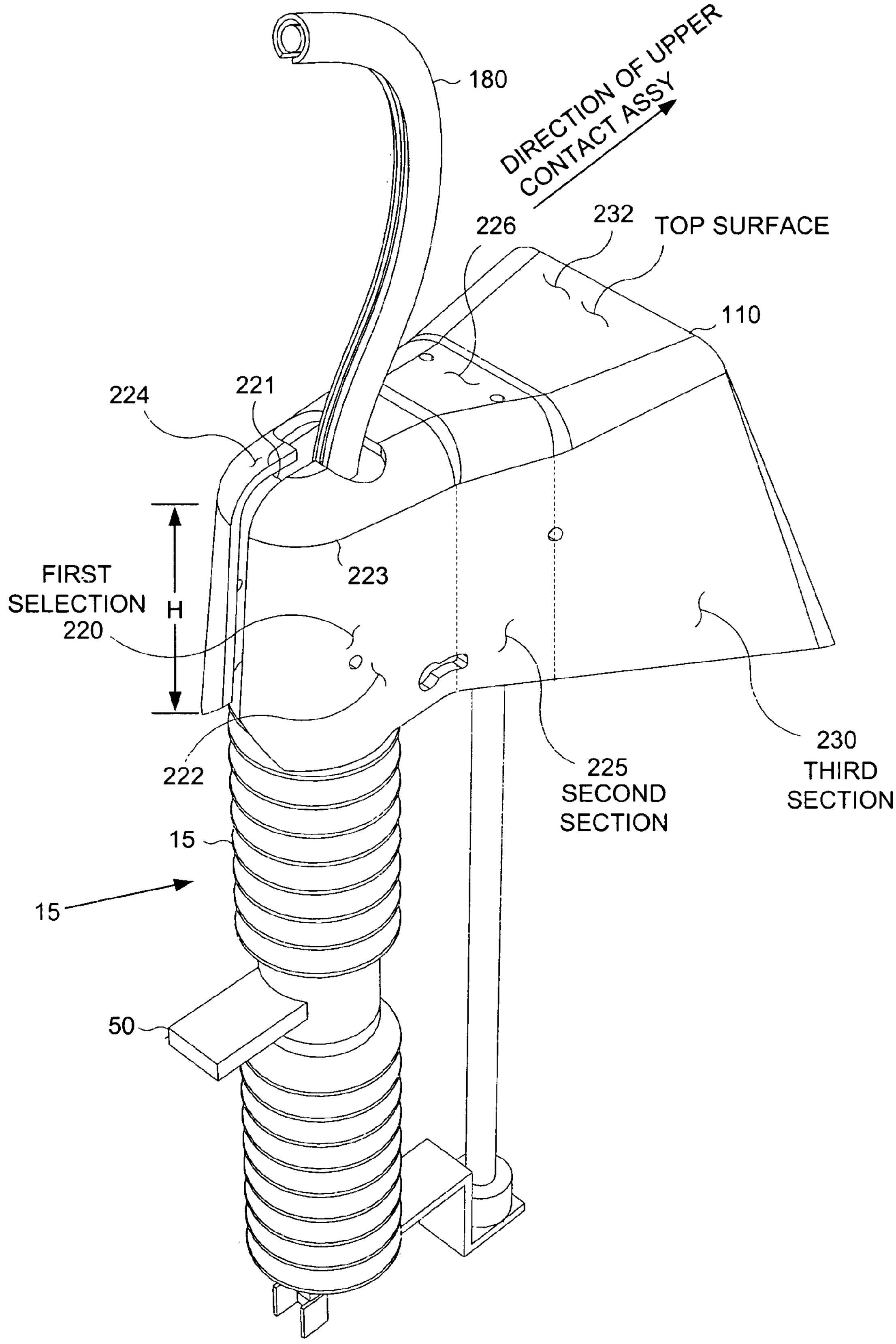
FIG. 9 is a pictorial diagram that depicts one example embodiment of a cutout cover according to the present invention.

FIG. 9 is a pictorial diagram that depicts one example embodiment of a cutout cover according to the present invention. According to this example embodiment, a cutout cover comprises a first section 220, a second section 225 and a third section 230. It should be noted that the definition of these sections is made here for the purposes of illustrating the formation of a cutout cover 110 according to the present invention and should not be used to exclude from the scope of the appended claims any alternative embodiments that may become apparent upon the reading of this specification.

According to this illustrative embodiment of a cutout cover 110, the first section 220 is formed to envelope a portion of the perimeter of the insulator 15 comprising the cutout 10, said portion being substantially in opposition to the direction in which the upper contact assembly 25 protrudes outward from the insulator 15. Accordingly, any appropriate perimeter shape may be used in fashioning the first section 220 of the cutout cover 110. Generally, the perimeter of the insulator is followed to a point where a second section 225 begins. This, according to at least one embodiment of the invention, is a point where a wall comprising the insulator perimeter envelope may be extended tangentially in a direction substantially parallel to the upper contact assembly 25. The perimeter wall 222 envelope in the insulator 15 has an upper edge 223. The cutout cover 110 further comprises a first section top surface 224. According to one alternative embodiment of the present invention, the first section 220 of the cutout cover 110 may further comprise a conductor slot 221 that breaches the insulator perimeter wall 222 and extends inward toward the center of the first section top surface 224 to a location where a conductor may be connected to the upper connector 20 of the cutout 10.

The second section 225 of the cutout cover 110 begins where the first section leaves off. Two perimeter walls, substantially opposing each other, straddle the upper contact assembly 25 and are bridged by a second section top surface 226. The second section top surface 226 flows from the first section top surface 224. According to one alternative embodiment of the present invention, the second section may expand in width about the upper contact assembly in order to provide clearance for a hook assembly 30 included in a fuse holder assembly 35. The second section perimeter walls may further comprise pin-holes, said pin holes being placed in substantial opposition to each other in opposing walls and further placed either below the upper contact assembly 25 or below the hook assembly 30.

Third section 230 of the cutout cover 110 continues from the second section 225. The third section 230 comprises a third section top surface 232. Envelope walls blend downward way from the third section top surface 232 outward away from the upper contact assembly 25. The purpose for this is to provide an additional containment volume for a hooks 30 included in one embodiment of a cutout 10. Further, this outward slope forms a funnel-shape that is wider at the bottom of the cutout cover 110. This funnel-shape enables attachment of a load-breaking tool to the hooks 30 and to a pull-ring 40 included in a fuse holder assembly 35, wherein attachment can be accomplished at various angles relative to an axis defined by the fuse holder assembly 35.

The height (H) of the various sections of a cutout cover 110 may be adjusted to accommodate various types of cutouts. The height (H) of the first section 220 is adjusted so as to prevent excessive encroachment over the insulator 15. This height is selected empirically in order to minimize any possible reduction in electrical isolation to the mounting bracket 50 provided by the insulator 15. The height of the second and third sections (225,230) is varied in order to accommodate the vertical placement of the hook assembly 30 relative to the upper contact assembly 25 and the vertical placement of the pull-ring 40 included in the fuse holder assembly 35. Hence, where the height of the first section 220 is selected to minimize its impact on the isolative characteristics of the insulator 15, the height of the second and third sections (225,230) are selected to provide a minimum volume about the upper end of the fuse receptacle so as to shield the hooks 30, the upper end of the fuse holder assembly 35 and its associated pull-ring 40.

According to one alternative embodiment of the present invention, a single piece cutout cover 110 may be constructed by molding a dialect material into the shapes described for the first, second and third sections. Such a molded part may be constructed using any suitable dialect material that provides sufficient electrical isolation and is resilient to the ultraviolet radiation present in ordinary sunlight. Various materials suitable for such molding of a cutout cover include, but are not necessarily limited to high-density polyethylene. It should be noted that the claims appended hereto are not to limited to any particular material listed herein.

The invention further comprises a flexible insulator conductor shroud 180 that is fabricated from dielectric material. The conductor shroud comprises a slot and is pliable to the extent that the slot may be spread apart in order to cover a conductor. The dielectric material is selected in order to provide the resilience necessary to return to its original shape so as to envelope the conductor. According to one example embodiment of the present invention, the flexible insulator conductor shroud 180 is fashioned from high-density polyethylene. It should be noted that the claims appended hereto are not to limited to any particular material listed herein.

Figure 10:
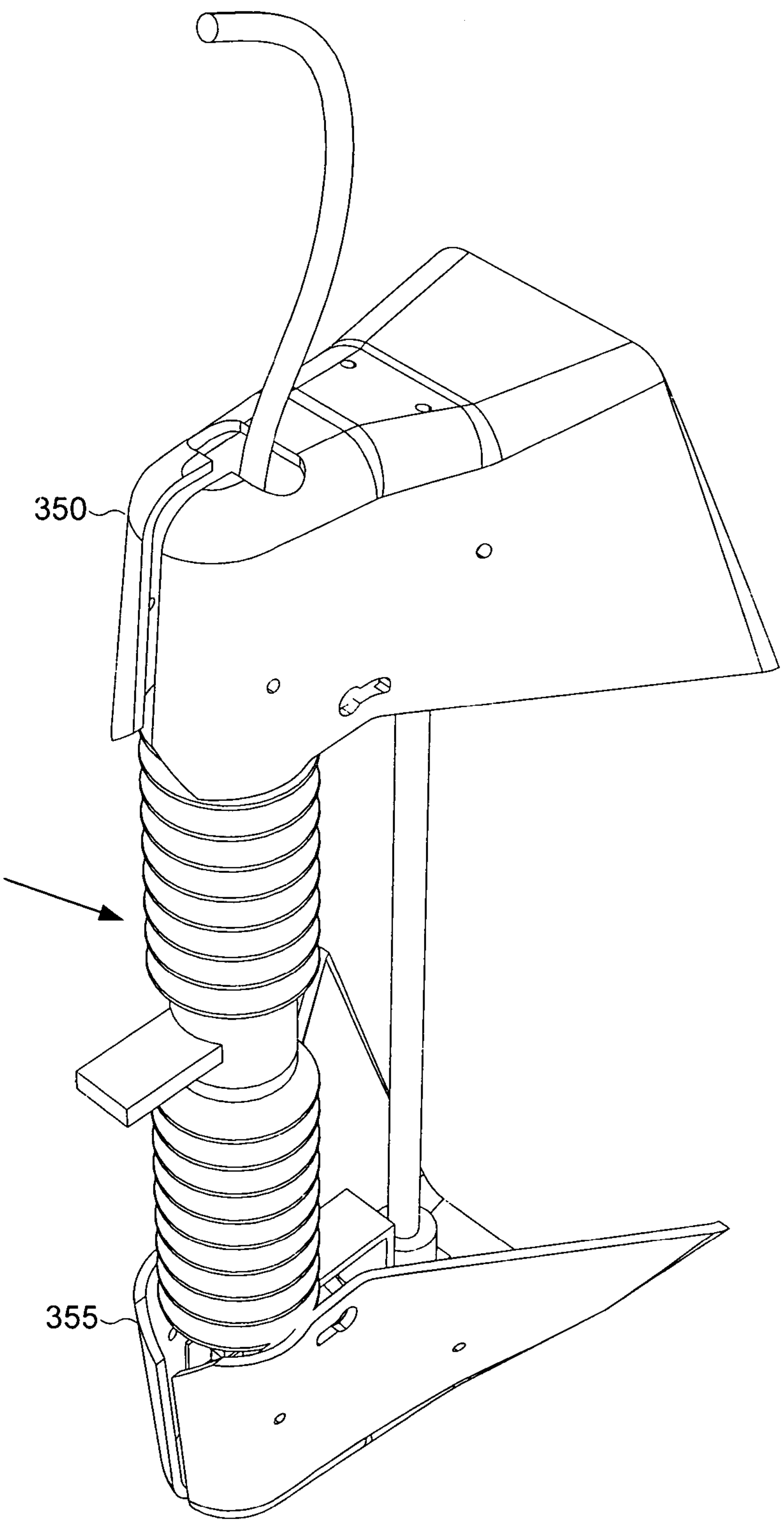
FIGS. 10 and 11 are, respectively, a perspective and profile pictorial diagrams that depict one alternative method for shrouding a lower contact assembly of a cutout.
Figure 11:
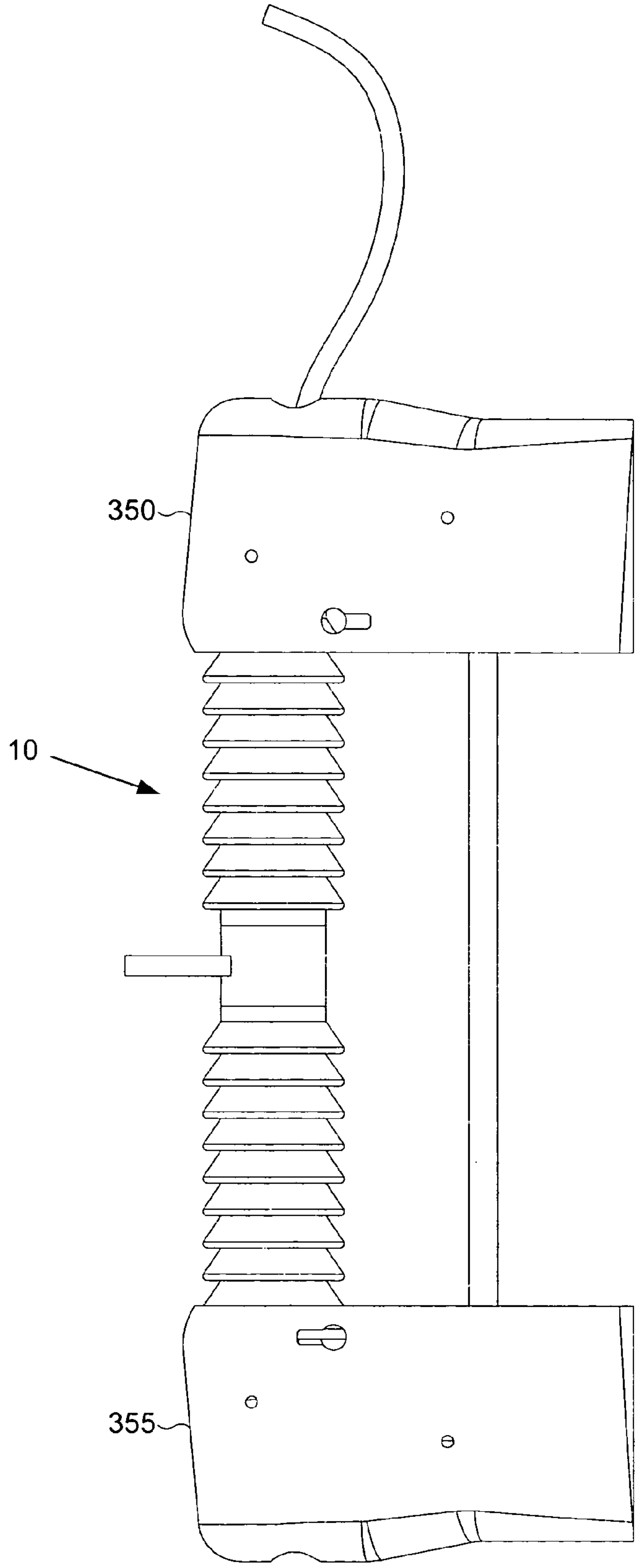

FIGS. 10 and 11 are, respectively, a perspective and profile pictorial diagrams that depict one alternative method for shrouding a lower contact assembly of a cutout 10. According to one alternative method, the lower contact assembly is shrouded by a second 355. This is an optional step to a first example method wherein the upper contact assembly of a cutout 10 is shrouded by a first shroud 350.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for protecting wildlife from electrocution from an energized cutout assembly having upper and lower contact assemblies comprising:

shrouding an upper connector;

shrouding the upper contact assembly; and shrouding a volume surrounding an upper-end of a fuse holder assembly wherein the fuse holder assembly includes an attachment means for a load breaking tool, and wherein all shrouding is accomplished using a one-piece shroud, wherein the shroud has a slot for accomplishing the shrouding and removing while an upper electrical wire is energized;

wherein the step of shrouding an upper connector comprises the steps of:

positioning a shroud over an upper conductor; and drawing the shroud over the upper end of the cutout assembly;

further comprising the step of disposing a pin through a first side of the shroud, the internal side of the upper contact assembly and a second side of the shroud to prevent unintended dislodging of the shroud.

2. The method of claim 1 further comprising the step of maintaining the dielectric integrity of an insulator supporting at least one of the upper connector and upper contact assembly.

3. The method of claim 2 wherein maintaining the dielectric integrity of the insulator comprises not bridging one or more skirts included in the insulator.

4. The method of claim 1 further comprising the step of providing an opening to the volume surrounding the upper-end of a fuse holder assembly, wherein said opening is for receiving the load breaking tool.

5. The method of claim 1 further comprising the steps of shrouding a portion of the upper electrical wire substantially from where the shroud for an upper connector is situated to a point along the electrical wire where wildlife can not come in contact with said electrical wire.

6. The method of claim 1 further comprising the steps of:

shrouding a lower connector;

shrouding a the lower contact assembly;

shrouding a volume surrounding a lower-end of a fuse holder assembly.

7. A cutout cover assembly comprising a single-piece upper cover that includes:

a first shroud section for shrouding an upper connector wherein the first shroud section comprises a conductor slot enabling installation of the cutout cover while the upper connector is attached to an upper electrical wire;

a second shroud section continuing from the first shroud section for shrouding an upper contact assembly;

a third shroud section continuing from the second shroud section for shrouding a volume surrounding an upper-end of a fuse holder assembly wherein the upper-end of the fuse holder assembly includes an attachment means for a load-breaking tool;

wherein the third shroud section comprises a top surface and two substantially opposing walls that continue to the end of a containment volume about the upper end of a fuse receptacle;

further comprising a tool inlet formed by sloping the two substantially opposing walls of the third section outward relative to the top surface; and wherein the upper cover has the slot for accomplishing the shrouding and removing while the upper electrical wire is energized.

8. The cutout cover of claim 7 wherein the cutout includes an insulator and wherein the first shroud section, the second shroud section and the third shroud section, either collectively, individually or in any combination do not substantially compromise the dielectric integrity of the insulator.

9. The cutout cover of claim 7 wherein the cutout includes an insulator and wherein the first shroud section, the second shroud section and the third shroud section either collectively, individually or in any combination do not bridge one or more skirts included in the insulator.

10. The cutout cover of claim 7 wherein the first shroud section comprises either a multi-planar wall or a swept wall that surrounds a substantial portion of an insulator perimeter and a top surface.

11. The cutout cover of claim 7 wherein the second shroud section comprises two substantially opposing walls having upper edges wherein said walls straddle the upper contact assembly of a cutout and a top surface bridging the two walls at their upper edges.

12. The cutout cover of claim 7 further comprising two pin-holes disposed in opposing sides of the shroud and positioned below the height of an upper contact assembly.

13. The cutout cover of claim 7 further comprising a conductor shroud.

* * * * *